United States Patent [19]

McConnell

[11] Patent Number: 5,408,782
[45] Date of Patent: Apr. 25, 1995

[54] TREE SKIRT

[76] Inventor: Robin B. McConnell, 7799 Hawkcrest, Cordova, Tenn. 38018

[21] Appl. No.: 232,656

[22] Filed: Apr. 25, 1994

[51] Int. Cl.$^6$ ............................................. A01G 17/12
[52] U.S. Cl. ................................... 182/187; 43/1; 47/24; 405/216
[58] Field of Search .................. 47/24 T, 24, 21, 22; 405/216 X; 182/187; 43/1

[56] References Cited

U.S. PATENT DOCUMENTS

| | | |
|---|---|---|
| 379,948 | 3/1888 | Frantz . |
| 4,473,087 | 9/1984 | Cavender ............................. 43/1 |
| 4,474,265 | 10/1984 | Shinkle . |
| 4,658,452 | 4/1987 | Brockhaus . |
| 4,705,143 | 11/1987 | Ziemba ............................. 182/187 |
| 4,983,072 | 1/1991 | Bell ................................... 405/216 |
| 5,062,234 | 11/1991 | Green ................................... 43/1 |
| 5,102,265 | 4/1992 | Dokmo ............................. 405/216 |
| 5,191,665 | 3/1993 | Breedlove . |

*Primary Examiner*—Henry E. Raduazo
*Attorney, Agent, or Firm*—Walker, McKenzie & Walker

[57] ABSTRACT

A tree skirt for use by a hunter to wrap around a tree trunk. The tree skirt includes a reversible sheet of quilted insulating material having differing camouflage patterns on either exposed side, a reversible zipper to bind opposite sides of the sheet together around the tree, and upper and lower fasteners such as VELCRO for securing the excess girth of the tree skirt around the tree into a pleated fold. A detachable bib flap is attachable to a lower portion of the tree skirt for the hunter to sit upon as a barrier or cushion. Optionally, the bib may be waterproof to thereby reduce cold and dampness that might otherwise affect the hunter's pants. A storage pocket is provided for storage of the bib flap when detached.

16 Claims, 2 Drawing Sheets

TREE SKIRT

BACKGROUND OF THE INVENTION

1. Field of the Invention

The present invention relates, in general, to hunting accessories, and in particular, to a hunting safety and comfort device for wrapping around the trunk of a tree.

2. Information Disclosure Statement

Hunters often must sit in one position against a tree or in a tree stand, exposed to the elements, for long periods of time while awaiting the appearance of game. The hunter often and unintentionally makes noise by frictional contact between the: bark of the tree and the hunter's clothes, thereby frightening game away. Not only is such a position against a hard tree trunk uncomfortable, but the seat of the hunter's pants can become cold and wet from contact with the damp ground. Additionally, hunters risk being mistaken by other hunters for hunted animals, with the tragic consequence of being shot by the other hunters.

Well-known solutions for this problem include bulky seat cushions that the hunter can carry into the woods and camouflage clothing that the hunter may wear. However, no convenient hunting accessory is heretofore known that can be easily carried in a hunter's pocket when not in use, muffle noises caused by contact of the hunter's clothes with a tree trunk, cushion the contact of the hunter's back upon the tree trunk, keep the seat of the hunter's pants dry, and also visibly alert other hunters that a crouched hunter is nearby.

A preliminary patentability search in Class 47, subclasses 23 and 24; Class 182, subclass 187; and Class 5, subclasses 656 and 420, produced the following patents, some of which may be relevant to the present invention: Frantz, U.S. Pat. No. 379,948, issued Mar. 27, 1888; Shinkle, U.S. Pat. No. 4,474,265, issued Oct. 2, 1984; Brockhaus, U.S. Pat. No. 4,658,452, issued Apr. 21, 1987; and Breedlove, U.S. Pat. No. 5,191,665, issued Mar. 9, 1993.

SUMMARY OF THE INVENTION

The present invention is a tree skirt for use by a hunter to wrap around a tree trunk. The tree skirt includes a reversible sheet of quilted insulating material having differing camouflage patterns on either exposed side, closure means such as a reversible zipper to bind opposite sides of the sheet together around the tree, and upper and lower fastening means for securing the excess girth of the tree skirt around the tree into a pleated fold. A detachable bib flap is attachable to a lower portion of the tree skirt for the hunter to sit upon as a barrier or cushion from roots, frost, bark, or edges on a hunting stand. Optionally, the bib may be waterproof to thereby reduce cold and dampness that might otherwise affect the hunter's pants.

It is an object of the present invention to provide a hunter's accessory that can muffle noises caused by contact of the hunter's clothes with a tree trunk, cushion the contact of the hunter's back upon the tree trunk, cushion the hunter's seat, keep the seat of the hunter's pants dry, and also visibly alert other hunters that a crouched hunter is nearby.

DESCRIPTION OF THE PREFERRED EMBODIMENT

Figure 9:
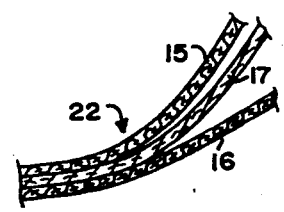
FIG. 9 is a sectional view of a portion of the tree skirt showing the separated layers thereof.

Referring to FIGS. 1–10, tree skirt 20 is seen to preferably comprise a reversible and generally rectangular sheet 22 of quilted material filled with insulating and cushioning batten filling so as to muffle noises that would otherwise be caused by contact of the hunter with a tree trunk and to cushion the hunter against the tree trunk for comfort, as hereinafter described. FIG. 9 shows a section of sheet 22 with the layers separated, showing outer layers 15 and 16 quiltingly entrapping inner batten filling layer 17. Outer layers 15 and 16 are preferably 50% polyester and 50% cotton, and inner batten filling layer 17 may be similarly of 50% polyester and 50% cotton or may instead be cotton or wool or other suitable well-known batten filling so as to provide insulation and cushioning for the hunter. The quilt squares are preferably 1⅛ inches to 1¼ inches (2.9 cm to 3.2 cm) square to provide a rugged and durable surface, and sheet 22 preferably has overall dimensions of approximately 48 inches by 32 inches (122 cm by 81 cm ).

Figure 1:
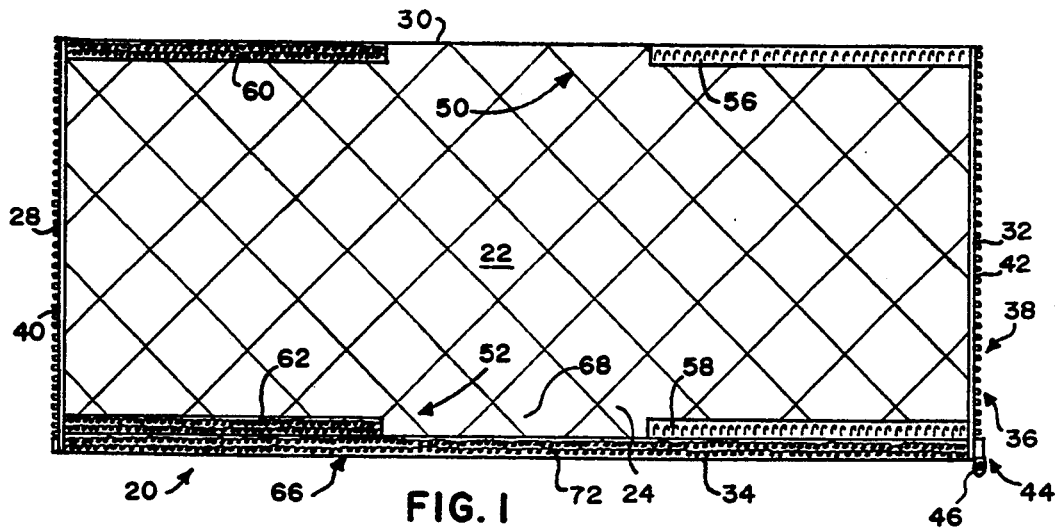
FIG. 1 is a view of one side of the tree skirt of the present invention.
Figure 2:
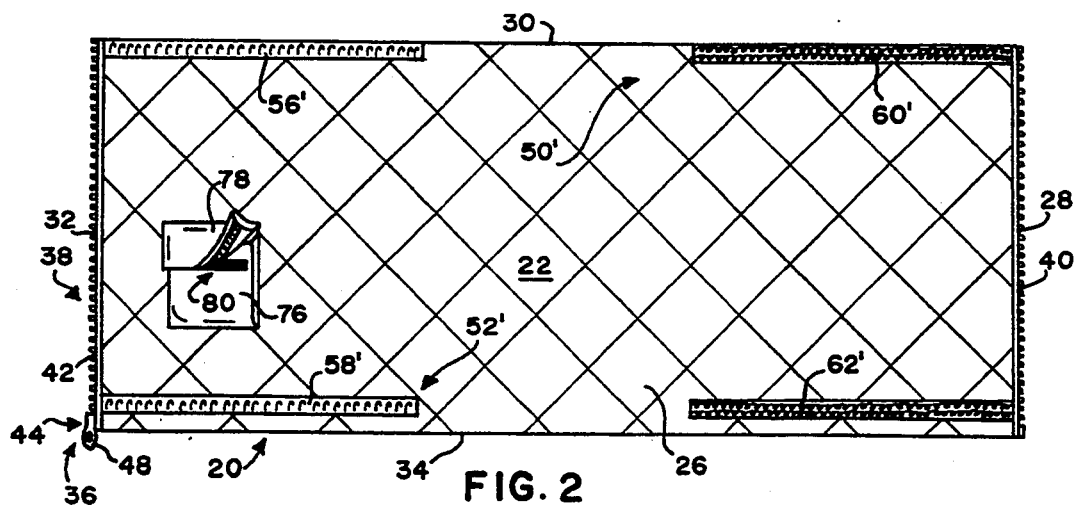
FIG. 2 is a view of the other side of the tree skirt of the present invention.

Sheet 22 has a first side 24 shown in FIG. 1 and a second side 26 shown in FIG. 2, it being understood that first and second sides 24 and 26 are generally similar and a description of either will suffice for both. As hereinafter described, the two sides of reversible tree skirt 20 allow different camouflage patterns to be on each side for selection by the hunter at the time of use.

Figure 3:
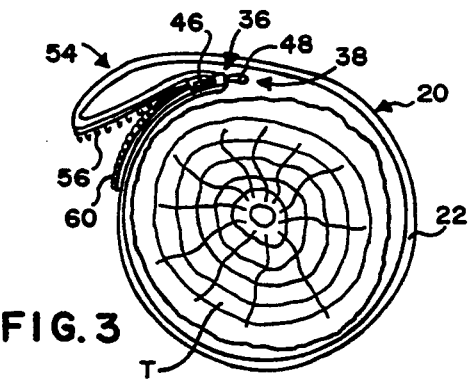
FIG. 3 is a top sectional view of the tree skirt being wrapped about a tree trunk.

Sheet 22 has, in sequence, a left edge 28, a top edge 30, a right edge 32, and a bottom edge 34. Tree skirt 20 includes closure means 36 for binding left edge 28 to right edge 32 when sheet 22 encircles a tree trunk T as shown in FIG. 3, it being understood that the circumference of tree trunk T must necessarily be less than both the length of top edge 30 and the length of bottom edge 34 so that sheet 22 may encircle the tree trunk T.

Closure means 36 preferably comprises a well-known reversible zipper 38 having left and right toothed strips 40 and 42, respectively along left and right edges 28 and 32, with zipper 38 further comprising well-known zipper sliding means 44 for engaging left and right toothed zipper strips 40 and 42 with each other in the well-known manner. Zipper sliding means 44 of zipper 38 preferably has two zipper pulls 46 and 48, one on each side, so that zipper 38 may be reversibly operated when first side 24 is facing outwardly away from tree trunk T, as well as when second side 26 is facing outwardly from tree trunk T, in a manner that will now be apparent. Many such so-called "reversible" zippers having two zipper pulls are well-known and readily available. It shall be understood that other well-known equivalents to zipper 38 may also be used for closure means 36 such as snaps, buttons, and the like, although zipper 38 is preferred.

Tree skirt 20 also includes upper and lower fastening means 50 and 52, preferably respectively adjacent top and bottom edges 30 and 34, as shown, for securing to sheet 22 the excess girth or "slack" of sheet 22 into a pleated fold 54 (shown being formed in FIG. 3), where the excess girth of sheet 22 is understood to be defined as the amount by which the lengths of top and bottom edges 30 and 34 are separately greater than the circumference of tree trunk T.

Upper and lower fastening means 50 and 52 are understood to be similar, and a description of either shall be understood to suffice for both. Upper and lower fastening means 50 and 52 each preferably and respectively include a first hook strip portion 56, 58 and a coacting first loop strip portion 60, 62 in mating alignment with first hook strip portion 56 or 58, respectively and adapted for interlocking engagement with first hook strip portion 56, 58, respectively. A suitable family of products for such upper and lower fastening means 50 and 52 are sold under the well-known trademark VELCRO, with many well-known equivalents such as post-and-post interlocking strips, etc., that may also and equivalently be used without departing from the spirit and scope of the present invention. Although snaps, buttons, etc. could similarly also be used for upper and lower fastening means 50 and 52, they are not as preferred as such VELCRO-type fasteners because of the finer adjustment of securing positions offered by VELCRO-type fasteners.

Figure 5:
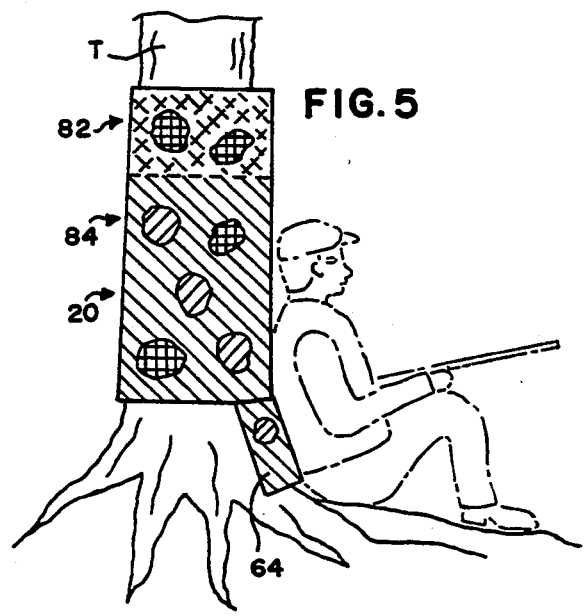
FIG. 5 is a view of a hunter using the tree skirt of the present invention at the base of a tree.
Figure 6:
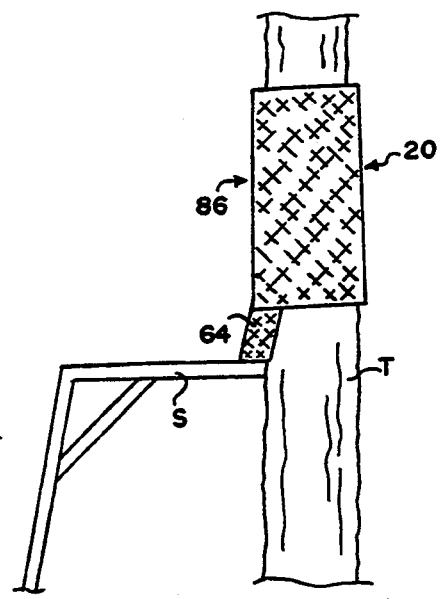
FIG. 6 is a view of the tree skirt of the present invention as used with a tree stand.

When tree skirt 20 is wrapped about a tree trunk, as shown in FIGS. 3, 5, and 6, the excess girth or slack of sheet 22 is understood to be held in a pleated fold 54, secured along top and bottom edges 30 and 34, so that sheet 20 is snugly held about the circumference of the tree trunk, with reversible zipper 38 acting as a hinge for one of the seams of pleated fold 54. It shall also be understood that, while first loop strip portions 60 and 62 each preferably have one end at left edge 28 of sheet 22, and similarly, first hook strip portions 56 and 58 each preferably have one end at right edge 32 of sheet 22, these strip portions may be translated together along top and bottom edges 30 and 34 so that the pleated fold appears at another position around skirt 22, although the embodiment shown is preferable so that one side of pleated fold 54 can use zip;per 38 as a hinge, as shown in FIG. 3. Hook strip portions 56 and 58 are each preferably 17.5 inches long by ¾ inch wide (44.5 cm by 1.9 cm), and loop strip portions 60 and 62 are each preferably 21.5 inches long by ¾ inch wide (54.6 cm by 1.9 cm).

So that tree skirt 20 may be reversible, second side 26 preferably also has another set of upper and lower fastening means 50' and 52', respectively, similar to upper and lower fastening means 50 and 52 on first side 24, with elements 56', 58', 60', and 62' that shall be understood to be substantially similar to their respective ("unprimed") counterpart elements 56, 58, 60, and 62 on first side 24.

Figure 4:
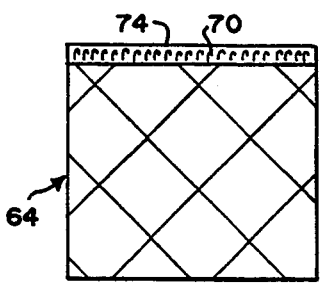
FIG. 4 is a view of the bib flap of the present invention.

Tree skirt 20 also preferably includes a bib flap 64 as shown in FIGS. 4-6 and bib fastening means 66 for removably fastening bib flap 64 to a lower portion 68 of sheet 22 adjacent bottom edge 34. Bib flap 64 is preferably 12 inches high by 13 inches across (30.5 cm by 33 cm). Bib fastening means 66 preferably comprises a bib hook strip portion 70 and a bib loop strip portion 72, one of which is secured to lower portion 68 of sheet 22 as shown, preferably extending along the entire length of lower edge 34 of sheet 22, and the other of which is secured to bib flap 64, preferably along the top edge 74 thereof as shown, for interlocking engagement between bib hook strip portion 70 and bib strip portion 72. As with upper and lower fastening means 50 and 52, suitable family of products for bib fastening means 66 are sold under the well-known trademark VELCRO, with many well-known equivalents such as post-and-post interlocking strips, etc., that may also and equivalently be used without departing from the spirit and scope of the present invention. Although snaps, buttons, etc. could similarly also be used for bib fastening means 66, they are not as preferred as such VELCRO-type fasteners because of the finer adjustment of securing positions along lower edge 34 of sheet 22 offered by VELCRO-type fasteners.

Figure 10:
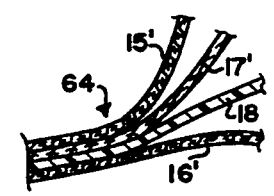
FIG. 10 is a sectional view of a portion of the bib flap of the present invention showing the separated layers thereof and an optional waterproof layer.

Bib flap 64 may be constructed in layers as heretofore described for sheet 22 and as shown in FIG. 9 so that the hunter may have a comfortably cushioned seat and barrier from roots, frost, bark, the cold ground, or edges on a hunting stand. Optionally, bib flap 64 may also be made waterproof to further reduce cold and dampness that might otherwise affect the hunter's pants, either by treating outer layers 15 and 16 with any of a number of well-known water repellant treatments so that the outer layers become substantially waterproof, by using any of a number of well-known water repellant materials for outer layers 15 and 16, or by adding one or more substantially waterproof layers to bib flap 64 as shown in FIG. 10. As shown in FIG. 10, bib flap 64 may have a separate substantially waterproof layer 18 as a part of the quilted sandwich of layers, here shown with primed reference numerals (15', 16', and 17') corresponding to similar elements (15, 16, and 17, respectively) in FIG. 9. Waterproof layer 18 may be constructed of vinyl-coated cotton, vinyl-coated tightly-woven nylon, an insulating waterproof material such as that sold under the trademark GORE-TEX, or nylon laminated with a waterproofing material such as that sold under the trademark HYPALON by the DuPont Company. The term waterproof, as used herein, shall be understood to describe water repellant materials also.

Tree skirt 20 also preferably includes a storage pocket 76 affixed to one side of sheet 22, preferably six inches by eight inches (15.2 cm by 20.3 cm), for holding bib flap 64 when it is not attached to sheet 22 by bib fastening means 66. Pocket 76 preferably has a pocket flap 78 and flap closure means 80 such as snaps or buttons or preferably hook and loop 3 fasteners such as the VELCRO-type fasteners used elsewhere on the invention as heretofore described.

Preferably, first and second sides 24 and 26 of sheet 22 have different camouflage patterns thereon, several exemplary camouflage patterns being shown in FIGS. 5-8. It shall be understood that the appearance of the various camouflage patterns are only shown somewhat schematically because various camouflage patterns themselves are well-known to those skilled in the art.

FIG. 5 shows one camouflage pattern in which the top ten inches (25.4 cm) of tree skirt 20 above the hunter's head is a fluorescent orange and black camouflage pattern 82 while the lower remainder of tree skirt 20 is a "bark"-type mottled pattern 84 of black, brown, and green.

FIG. 6 shows another camouflage pattern 86 in which the exposed side of tree skirt 20 is fluorescent orange.

Figure 7:
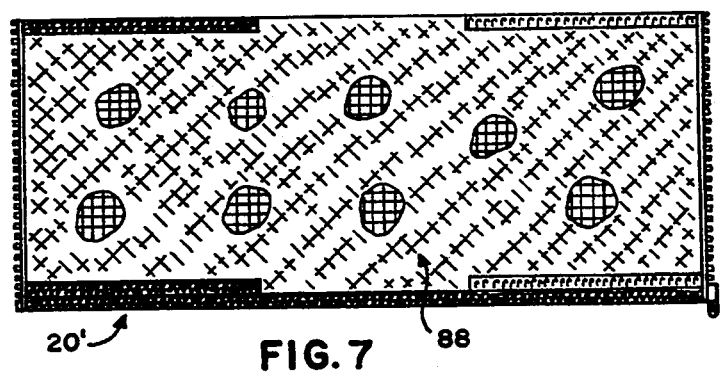
FIG. 7 is a view of one side of the tree skirt of the present invention, lined to schematically show one type of camouflage.

FIG. 7 shows another camouflage pattern 88 in which the entire exposed side of tree skirt 20' is a fluorescent orange and black camouflage pattern.

Figure 8:
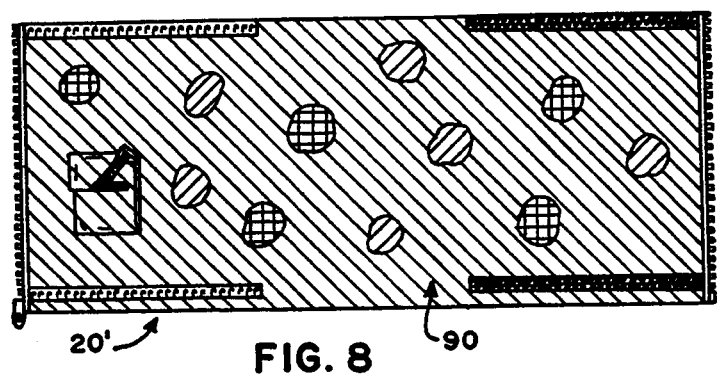
FIG. 8 is a view of the other side of the tree skirt of the present invention, lined to schematically show another type of camouflage.

FIG. 8 shows yet another camouflage pattern 90 in which the entire exposed side of tree skirt 20' is a "bark"-type mottled pattern of black, brown, and green.

Any particular tree skirt will be understood preferably to have one chosen camouflage pattern on one side and another chosen camouflage pattern on the other side, and the reversible nature of the tree skirt allows one pattern or the other to be exposed outwardly as desired by the hunter. Bib flap 64 will also be understood to be similarly reversible.

To use the tree skirt 20, a hunter wraps it around a tree trunk and fastens edge 28 to edge 32 using closure means 36. The excess girth is then gathered into a pleated fold 54 as shown in FIG. 3 and then secured to tree skirt 20 by upper and lower fastening means 50 and 52, thereby snugly securing tree skirt 20 to the tree trunk. Whether tree skirt 20 is used with a hunter's tree stand S as shown in FIG. 6, or at the bottom of tree trunk T as shown in FIG. 5, bib flap 64 can then be attached to sheet 22 as heretofore described, and the hunter can then sit on bib flap 64 for comfort and protection from dampness and cold. As the hunter leans against tree skirt 20, the quilted insulating material muffles noises that might otherwise occur and scare away game due to frictional chafing of the hunter's clothes against the bark of the tree trunk, and also provides comfortable padding between the hunter and the tree trunk. Additionally, the tree skirt 20 prevents bark from falling off of the tree trunk and hitting the tree stand S in FIG. 6, thereby preventing the associated noise that might scare away game. A hunter's well-known safety harness (not shown) can be easily slid over tree skirt 20 to prevent the hunter from falling from tree stand S. When a fluorescent orange camouflage pattern is exposed, the fluorescent pattern may be seen in all directions around the tree, thereby providing warning to other hunters that the hunter leaning against the tree should not be shot by accident.

Although the present invention has been described and illustrated with respect to a preferred embodiment and a preferred use therefor, it is not to be so limited since modifications and changes can be made therein which are within the full intended scope of the invention.

I claim:

1. A tree skirt for use by a hunter to wrap around a tree trunk, said tree skirt comprising:
   (a) a sheet having a first side, and a second side, said sheet having, in sequence, a left edge, a top edge, a right edge, and a bottom edge, said top and said bottom edges each having a length;
   (b) closure means for binding said left edge to said right edge when said sheet encircles a tree trunk having a circumference separately less than the lengths of said top and said bottom edges; and
   (c) upper and lower fastening means, respectively adjacent said top and said bottom edges, for securing to said sheet the excess girth of said sheet into a pleated fold, said excess girth being defined as the amount by which the lengths of said top and said bottom edges are separately greater than the circumference of said tree trunk.

2. The tree skirt as recited in claim 1, in which said closure means comprises a zipper having left and right toothed zipper strips respectively along said left and right edges, said zipper further comprising zipper sliding means for engaging said left and said right toothed zipper strips with each other.

3. The tree skirt as recited in claim 1, in which each said upper and lower fastening means includes a first hook strip portion and a coacting first loop strip portion in mating alignment with said first hook strip portion and adapted for interlocking engagement with said first hook strip portion.

4. The tree skirt as recited in claim 1, in which said tree skirt further includes a bib flap and bib fastening means for removably fastening said bib flap to a lower portion of said sheet adjacent said bottom edge.

5. The tree skirt as recited in claim 4, in which said bib fastening means comprises a bib hook strip portion and a bib loop strip portion, one of which is secured to said lower portion of said sheet and the other of which is secured to said bib flap, for interlocking engagement therebetween.

6. The tree skirt as recited in claim 4, in which said tree skirt further comprises a storage pocket on said sheet, sized for holding said bib flap when said bib flap is removably unfastened from said lower portion of said sheet.

7. The tree skirt as recited in claim 4, in which said bib flap includes a layer of substantially waterproof material.

8. The tree skirt as recited in claim 1, in which said sheet is made of quilted insulating material.

9. The tree skirt as recited in claim 1, in which said tree skirt is reversible and has said upper and lower fastening means both on said first side and on said second side, in which said first and said second sides of said sheet have different camouflage patterns thereon, and in which said closure means comprises a reversible zipper having left and right toothed zipper strips respectively along said left and right edges, said zipper further comprising reversible zipper sliding means for engaging said left and said right toothed zipper strips with each other with either said first or said second side of said sheet facing said tree trunk.

10. A tree skirt for use by a hunter to wrap around a tree trunk, said tree skirt comprising:
   (a) a sheet having a first side and a second side, said sheet having, in sequence, a left edge, a top edge, a right edge, and a bottom edge, said top and said bottom edges each having a length;
   (b) closure means for binding said left edge to said right edge when said sheet encircles a tree trunk having a circumference separately less than the lengths of said top and said bottom edges, said closure means comprising a zipper having left and right toothed zipper strips respectively along said left and right edges, said zipper further comprising zipper sliding means for engaging said left and said right toothed zipper strips with each other;
   (c) upper and lower fastening means, respectively adjacent said top and said bottom edges, for securing to said sheet the excess girth of said sheet into a pleated fold, said excess girth being defined as the amount by which the lengths of said top and said bottom edges are separately greater than the circumference of said tree trunk, each said upper and lower fastening means including a first hook strip portion and a coacting first loop strip portion in mating alignment with said first hook strip portion and adapted for interlocking engagement with said first hook strip portion.

11. The tree skirt as recited in claim 10, in which said tree skirt further includes a bib flap and bib fastening means for removably fastening said bib flap to a lower portion of said sheet adjacent said bottom edge.

12. The tree skirt as recited in claim 11, in which said bib fastening means comprises a bib hook strip portion and a bib loop strip portion, one of which is secured to said lower portion of said sheet and the other of which is secured to said bib flap, for interlocking engagement therebetween.

13. The tree skirt as recited in claim 11, in which said tree skirt further comprises a storage pocket on said sheet, sized for holding said bib flap when said bib flap is removably unfastened from said lower portion of said sheet.

14. The tree skirt as recited in claim 11, in which said bib flap includes a layer of substantially waterproof material.

15. The tree skirt as recited in claim 10, in which said first and said second sides of said sheet have different camouflage patterns thereon, in which said tree skirt is reversible and has said upper and lower fastening means both on said first side and on said second side, and in which said zipper is reversible.

16. The tree skirt as recited in claim 15, in which said sheet is made of quilted insulating material.

* * * * *